United States Patent [19]

Bruedigam et al.

[11] Patent Number: 5,983,859

[45] Date of Patent: Nov. 16, 1999

[54] METHOD FOR CONTROLLING AN INTERNAL COMBUSTION ENGINE

[75] Inventors: Claus Bruedigam, Tegernheim, Germany; Klaus Eppinger, Toulouse; Laurent Pavy, Tournefeuille, both of France; Wolfgang Schindler, Regenstauf, Germany

[73] Assignee: Siemens Aktiengesellschaft, Munich, Germany

[21] Appl. No.: 09/017,468

[22] Filed: Feb. 2, 1998

[30] Foreign Application Priority Data

Jan. 31, 1997 [DE] Germany .......................... 197 03 685

[51] Int. Cl.$^6$ .................................................. F02D 41/22
[52] U.S. Cl. ............................................ 123/396; 123/399
[58] Field of Search ................................ 123/198 D, 361, 123/396, 397, 399, 479; 73/118.1

[56] References Cited

U.S. PATENT DOCUMENTS

| | | | |
|---|---|---|---|
| 5,260,877 | 11/1993 | Drobny et al. ........................... | 123/399 |
| 5,339,782 | 8/1994 | Golzer et al. ............................ | 123/399 |
| 5,429,092 | 7/1995 | Kamei ...................................... | 123/399 |
| 5,447,134 | 9/1995 | Yokoyama ............................... | 123/399 |
| 5,553,581 | 9/1996 | Hirabayashi et al. ................... | 123/399 |
| 5,623,905 | 4/1997 | Kau et al. ................................ | 123/361 |
| 5,669,353 | 9/1997 | Shirai et al. ............................. | 123/399 |

*Primary Examiner*—Tony M. Argenbright
*Attorney, Agent, or Firm*—Herbert L. Lerner; Laurence A. Greenberg

[57] ABSTRACT

Two accelerator pedal position sensors independently sense the position of an accelerator pedal driving an internal combustion engine. A first emergency running mode of the internal combustion engine is set if a failure is detected of either the first or the second pedal position sensor. In the first emergency running mode, the torque at a shaft of the drive train is limited to an emergency running mode torque which depends on at least one operating variable.

7 Claims, 5 Drawing Sheets

METHOD FOR CONTROLLING AN INTERNAL COMBUSTION ENGINE

BACKGROUND OF THE INVENTION

Field of the Invention

The invention relates to a method for controlling an internal combustion engine to which a first pedal position sensor and a second pedal position sensor are assigned which each sense the position of an accelerator pedal. An emergency running mode of the internal combustion engine is actuated if a failure either of the first or of the second pedal position sensor is detected. An actuation signal for at least one actuator of the internal combustion engine is derived in the emergency running mode from the accelerator pedal position sensed by the fault-free pedal position sensor. A setpoint value for the torque is determined at a shaft of the drive train as a function of the position of the accelerator pedal.

A pertinent method for controlling an internal combustion engine is described in German published, non-prosecuted patent application DE 44 06 088 A1. The internal combustion engine is associated with two pedal position sensors, which each sense the position of an accelerator pedal. If a failure of one of the two pedal position sensors is detected, a control unit calculates an opening setpoint for the throttle valve from the accelerator pedal position sensed by the fault-free pedal position sensor. However, there exists a serious risk with the prior art method and device that the internal combustion engine is placed into uncontrolled acceleration mode if the second accelerator position sensor also fails.

SUMMARY OF THE INVENTION

It is accordingly an object of the invention to provide a method of controlling an internal combustion engine, which overcomes the above-mentioned disadvantages of the heretoforeknown devices and methods of this general type and which ensure a reliable and comfortable emergency running mode of the internal combustion engine.

With the foregoing and other objects in view there is provided, in accordance with the invention, a method of controlling an internal combustion engine connected to a drive train with a shaft, the method which comprises:
 providing a first pedal position sensor for sensing a position of an accelerator pedal and a second pedal position sensor for sensing the position of the accelerator pedal;
 setting the internal combustion engine to an emergency running mode if a failure is detected of one of the pedal position sensors and defining the other pedal position sensor as a fault-free pedal position sensor;
 deriving an actuation signal for at least one actuator of the internal combustion engine in the emergency running mode from
 the position of the accelerator pedal sensed by the fault-free pedal position sensor;
 determining a setpoint value of the torque at a shaft of the drive train as a function of the position of the accelerator pedal; and
 limiting the setpoint value in the emergency running mode to an emergency running mode setpoint-value which depends on at least one operating variable.

In accordance with an alternative mode of the invention, an actuation signal is derived for at least one actuator of the internal combustion engine in the emergency running mode from the position of the accelerator pedal sensed by the fault-free pedal position sensor; a setpoint value is determined of an air mass per stroke aspirated by a cylinder during a working cycle; and the setpoint value is limited in the emergency running mode to an emergency running mode air mass which depends on at least one operating variable.

In accordance with an added mode of the invention, a setpoint value of an air mass flow rate is determined as a function of the position of the accelerator pedal; and the setpoint value is limited in the emergency running mode to an emergency running mode setpoint-value which depends on a speed of the engine.

In accordance with another mode of the invention, the setpoint-value in the emergency running mode is additionally made dependent on a gear ratio of a vehicle transmission.

In accordance with a concomitant feature of the invention, the emergency running mode is effected if a difference between the positions of the accelerator pedal sensed by the first and second pedal position sensor is greater than a prescribed threshold value.

In other words, the novel process in a first embodiment is distinguished by limiting the setpoint value of the torque at a shaft of the drive train in a first emergency running mode to an emergency running mode setpoint-value which depends on at least one operating variable. The emergency running mode setpoint-value is configured in such a way that at the actual shaft torque, which corresponds to the emergency running mode setpoint-value, only a low acceleration of the vehicle is possible, which acceleration is however sufficient for a comfortable traveling mode. The values of the emergency running mode setpoint-value are preferably determined by measurement during a trial trip and are stored in a characteristic diagram as a function of at least one operating variable. The shaft of the drive train is preferably the crankshaft or the output shaft of the transmission.

Other features which are considered as characteristic for the invention are set forth in the appended claims.

Although the invention is illustrated and described herein as embodied in a method for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
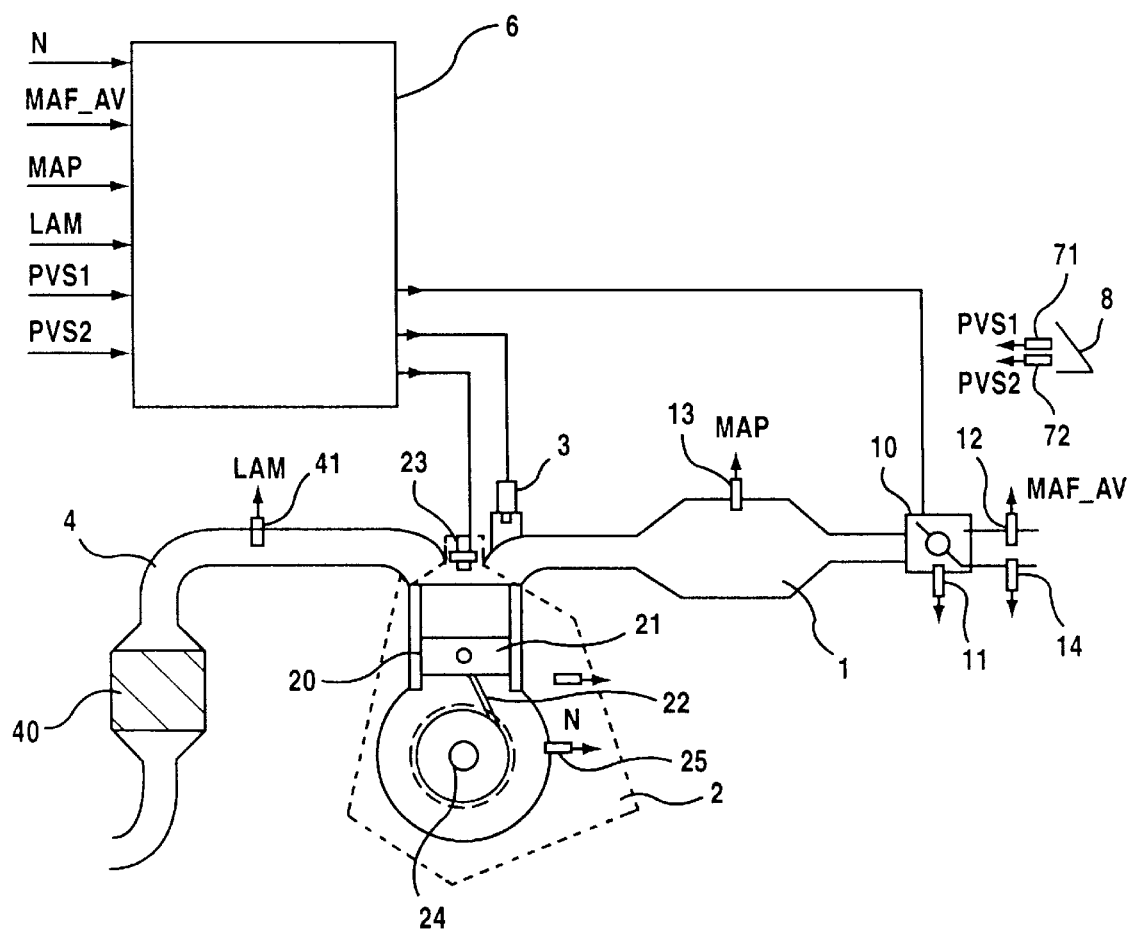
FIG. 1 is a schematic diagram showing an internal combustion engine with a device for controlling the internal combustion engine.

Referring now to the figures of the drawing in detail and first, particularly, to FIG. 1 thereof, there is seen an internal combustion engine with an intake tract 1, in which a throttle valve 10 is disposed, and an engine block 2. A cylinder 20 is shown with a piston 21 a piston rod 22 and a spark plug 23. A crankshaft is shown at 24. The piston rod 22 is a connecting rod 22 between the piston 21 and the crankshaft 24.

An injection valve 3 forms a part of an individual injection system and is disposed in the vicinity of the cylinder 20 in the intake tract 1. The internal combustion engine also comprises an exhaust gas tract 4, in which a catalytic converter 40 is disposed. The internal combustion engine is illustrated in FIG. 1 with one cylinder 20. It will be appreciated, however, that the engine may be a multi-cylinder engine with a plurality of cyclinders. The injection valve may also form part of a central injection system or a direct injection system.

A control unit 6 controls the internal combustion engine. The control unit 6 evaluates various measured variables obtained through a plurality of sensors and determines one or more actuation signals as a function of at least one of the measured variables. The actuation signals each control an actuator unit of the engine. The sensors are a first pedal position sensor 71, which senses a pedal position PV of the accelerator pedal 8, a second pedal position sensor 72, which senses the pedal position PV of the accelerator pedal 8, a throttle valve position sensor 11, which senses an actual value THR__AV of an opening angle of the throttle valve 10, an air mass flow rate meter 12, which senses an actual value MAF__AV of the air mass flow rate, and/or an intake manifold pressure sensor 13, which senses an intake manifold pressure MAP, a temperature sensor 14, which senses an ambient temperature, a rotational speed sensor 25, which senses a rotational speed N of the crankshaft 24, and an oxygen probe 41, which senses the residual oxygen content of the exhaust gas and which assigns an excess air factor LAM__AV to the latter.

The first pedal position sensor 71 and the second pedal position sensor 72 generate a first signal PVS1 and a second signal PVS2, respectively, which represents the pedal position PV of the accelerator pedal.

Operating variables comprise the measured variables and variables derived therefrom, such as ambient pressure. The actuator units comprise in each case an actuator drive and an actuator. The actuator drive is an electromotive drive, an electromagnetic drive, a mechanical drive or a further drive known to those of skill in the art. The actuators are designed as throttle valve, as injection valve, a spark plug or as change-over switch between two different intake manifold lengths. Reference is made in each case in the following text to the actuator units with the associated actuator.

The device for controlling the internal combustion engine is preferably an electronic engine controller. However, it may also comprise a plurality of control units, which are electrically conductively connected to one another, for example via a bus system.

Figure 2:
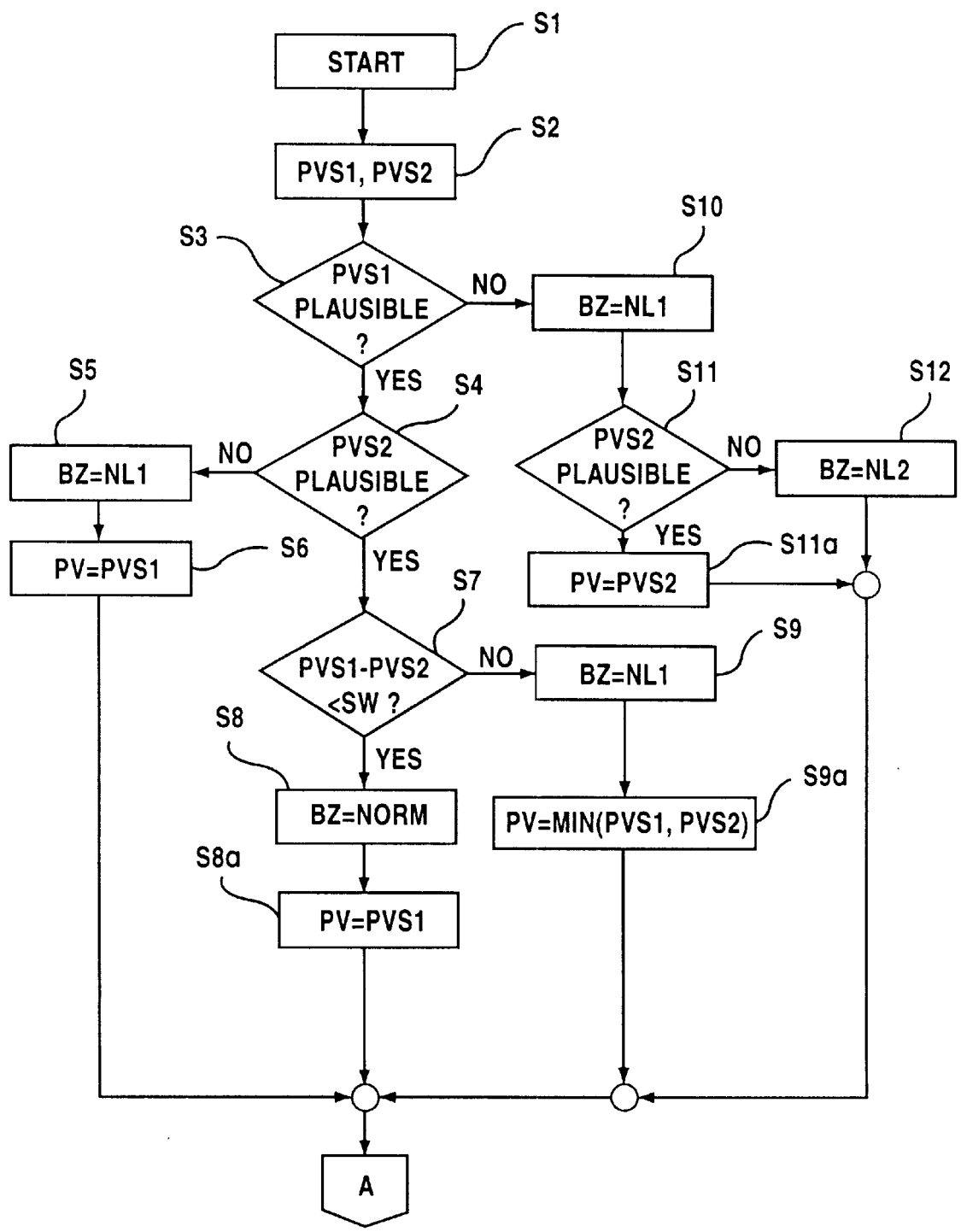
FIG. 2 is a first part of a flowchart illustrating a first embodiment of the invention.

Referring now to FIG. 2, a first mode of the invention starts at a step S1. In step S2 the first signal PVS1 and the second signal PVS2 are sensed. In a step S3 the signal PVS1 is subjected to a plausibility check, i.e., whether the first signal has a plausible value. To pass the query, the first signal PVS1 must lie within an acceptable voltage range, for example between 0.5 V and 4.5 V. If this is the case, the system branches into a step S4 in which, similarly to the step S3, the second signal PVS2 is subjected to a plausibility check. If the second signal is not plausible, the system branches into the step S5, in which the system changes into the operating state BZ of the first emergency running mode NL1. Then, in a step S6, the position PV of the accelerator pedal is determined from the first signal PVS1.

If the signal in the step S4 is judged to be plausible, the system branches into a step S7, in which the absolute value of the difference between the first and the second signals PVS1, PVS2 is compared with a predetermined threshold value SW. If the difference is less than the threshold value SW, the system branches into the step S8, in which the system changes into the operating state BZ=NORM (normal operating state). In the step S8a, the position PV of the accelerator pedal is then determined from the first signal PVS1.

If the query in the step S7 is not satisfied, then the system branches into a step S9, and the operating state BZ changes into the first emergency running mode NL1. It is not possible to determine which pedal position sensor is actually faulty. Therefore, in a step S9a, the position PV of the accelerator pedal 8 is determined by selecting the smaller of the first and second signals PVS1, PVS2.

The form of the condition in the step S7 is not essential to the invention. Therefore, it is also possible to determine whether the sum of the first and the second signals PVS1, PVS2 is equal to a prescribed threshold value SW, or whether the ratio of the first signal PVS1 to the second signal PVS2 is smaller than a prescribed threshold value SW.

If the first signal PVS1 in the step S3 is not plausible, the system branches into the step S10, in which the operating state BZ is set to the first emergency running mode NL1.

In a step S11, the second signal PVS2 is subjected to a plausibility check. This preferably includes determining whether the brake of the vehicle is activated, which can be detected, for example, from a brake light switch signal. A comparison is made to determine whether, when the brake is activated, the second signal has a value (for example 0.7 V) which represents an idling position of the accelerator pedal 8. If this is not the case, the system branches into a step S12, and the operating state BZ changes into a second emergency running mode NL2. In the second emergency running mode NL2, both the first and the second pedal position sensors 71, 72 are detected as being faulty. Otherwise, the system branches into a step S11a, in which the position PV of the accelerator pedal 8 is determined from the second signal PVS2.

Figure 3:
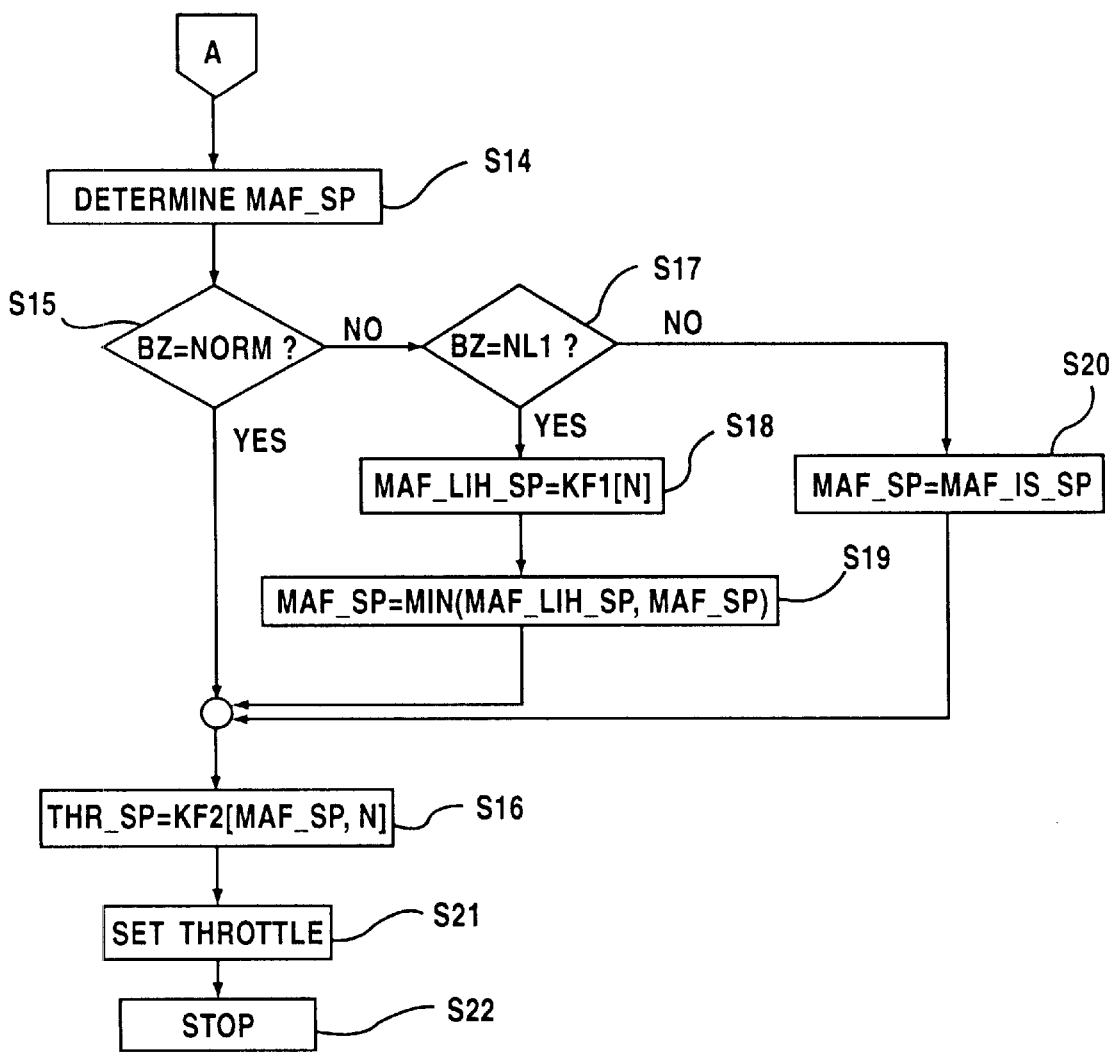
FIG. 3 is a second part of the flowchart thereof.

Referring now to FIG. 3, a step S14 entails determining a setpoint value MAF__SP of the air mass flow rate. The setpoint value MAF__SP of the air mass flow rate is determined from a characteristic diagram as a function of the pedal position and of the rotational speed N and/or of further operating variables. In a more comfortable embodiment of the invention, a physical model of the intake tract 1 is provided which models the dynamic behavior of the air mass flow rate in the intake tract 1 and which is used to calculate the setpoint value MAF__SP of the air mass flow rate.

In a step S15 the internal combustion engine is tested whether it is in the normal NORM operating state. If this is the case, the system branches into a step S16.

If the operating state BZ is equal to the first emergency running mode NL1, then at a step S17 the system branches into the step S18. There, an emergency running mode setpoint value MAF__LIH__SP of the air mass flow rate is determined from a first characteristic diagram KF1 as a function of the rotational speed N. The first characteristic diagram KF1 is applied, for example, in such a way that at low rotational speeds N the emergency running mode setpoint-value MAF__LIH__SP of the air mass flow rate corresponds to an air mass per stroke which is equivalent to low rotational speeds at, for example, 20% of the maximum air mass per stroke, to medium rotational speeds at, for example, 40% of the maximum air mass per stroke and to high rotational speeds at, for example, 60% of the maximum air mass per stroke. The air mass per stroke is obtained from the air mass which is sucked in by a cylinder 10 during a working cycle of the internal combustion engine.

In a step S19, the result of a minimum selection of the emergency running mode setpoint-value MAF_LIH_SP and the setpoint value MAF_SP of the air mass is assigned to the setpoint value MAF_SP.

If the first or the second pedal position sensor 71, 72 has failed, and then, respectively, the second or first pedal position sensor 71, 72 additionally fails, this can, under certain circumstances, be detected only if the brake is activated.

However, if the driver does not activate the brake then, because the driver, for example, does not know how he or she should react, an excessively high setpoint value MAF_SP of the air mass flow rate is calculated as a function of the sensed position PV of the accelerator pedal 8. If this setpoint value MAF_SP exceeds the assigned emergency running mode setpoint value MAF_LIH_SP, then the setpoint value MAF_SP is limited to the emergency running mode setpoint-value MAF_LIH_SP, and uncontrolled acceleration of the vehicle does not occur. The driver can then react correctly and activate the brake.

The first characteristic diagram KF1 is applied in such a way that, at the respective rotational speed N and the assigned emergency running mode setpoint MAF_LIH_SP of the air mass flow rate, the internal combustion engine only outputs to the crankshaft 24 an emergency running torque at which it is ensured that the vehicle does not accelerate to an unacceptable degree, but which nevertheless permits a comfortable traveling mode, that is to say a torque at which the vehicle can maintain its speed on the level or can lightly accelerate.

In the step S16, a setpoint value THR_SP is determined from a second characteristic diagram KF2 as a function of the setpoint value MAF_SP of the air mass flow rate and of the rotational speed N. The setpoint value THR_SP is preferably corrected multiplicatively or additively with a correction value. The correction value depends on the intake air temperature and/or the ambient pressure.

In a step S21, the throttle valve 10 is set in accordance with the setpoint value THR_SP of the opening angle of the throttle valve 10. To this end, an appropriate regulator is provided in the device 6 for controlling the internal combustion engine preferably has proportional, integral and differential characteristics and whose regulating difference is formed from the setpoint value THR_SP and the actual value THR_AV of the opening angle. If the throttle valve has an intelligent actuator drive, the actuator drive also includes the regulator. In the step S22, the process sequence is terminated. The process sequence is preferably started periodically.

Figure 4:
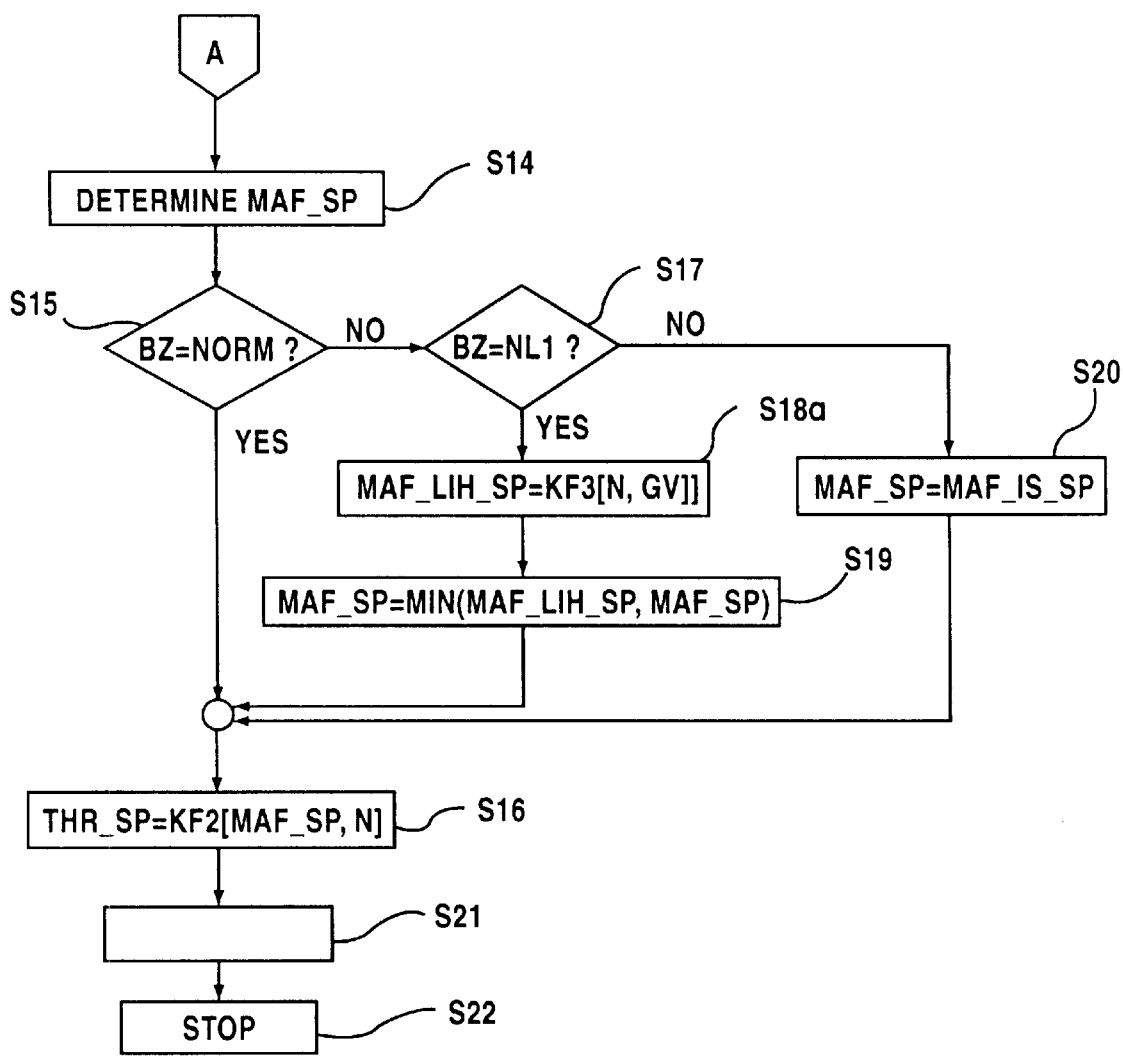
FIG. 4 is a second part of the flowchart in accordance with a second embodiment of the invention.
Figure 5:
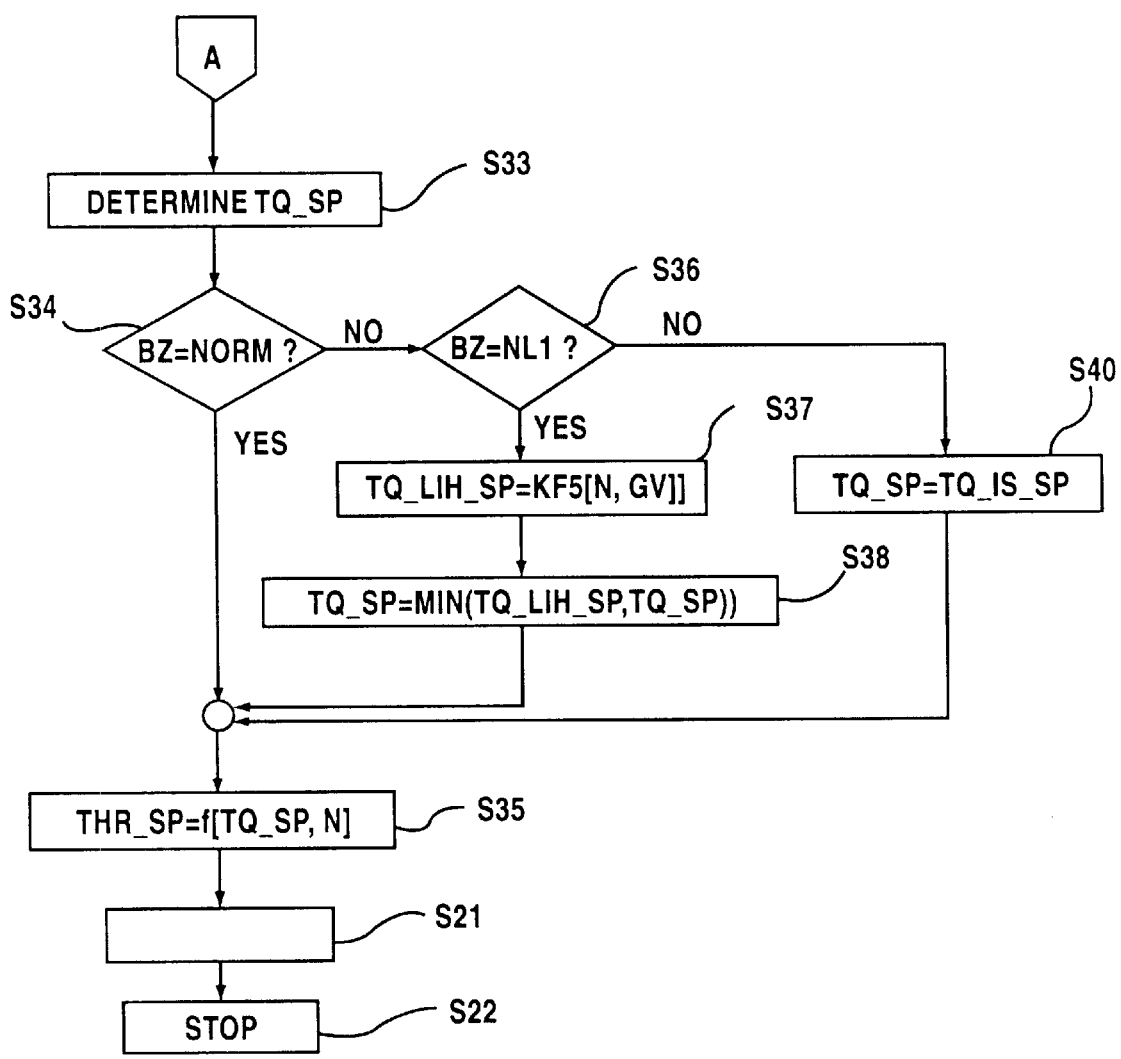
FIG. 5 is a second part of the flowchart in accordance with a third embodiment of the invention.

The second embodiment of the invention in accordance with FIG. 4 differs from the first embodiment of FIG. 3 in that the step S18 is replaced by the step S18a. There, the emergency running mode setpoint-value MAF_LIH_SP of the air mass flow rate is determined as a function of a third characteristic diagram KF3, which depends on the rotational speed N and on a gear ratio GV of the transmission. The third characteristic diagram KF3 is applied in such a way that in low gear the air mass setpoint-value MAF_SP is limited in such a way that a relatively slight vehicle reaction is possible, while in high gear the setpoint value MAF_SP of the air mass flow rate is limited to a small degree, since, in this case, the relatively high air resistance and the relatively high transmission ratio already prevent such a dangerous vehicle reaction.

In a third exemplary embodiment, in a step S33, a setpoint value TQ_SP of the torque is determined at a shaft in the drive train of the internal combustion engine. The drive train comprises the internal combustion engine and a non-illustrated gear box, which is a manual shift transmission or an automatic transmission. The shaft in the drive train is the crankshaft or the output shaft of the gear box. The setpoint value TQ_SP of the torque is determined as a function of the position PV of the accelerator pedal 8, the rotational speed N and, if appropriate, further operating variables. Moreover, it can also be advantageous to take into account the specified torque values of a traction control system, of an idling controller, of an engine torque controller or of a cruise control, and the torque requirement of sub-assemblies, such as a generator or an air conditioning unit compressor.

In a step S34 it is determined whether the internal combustion engine is in the normal NORM operating state BZ. If this is the case, the processing is continued in a step S35. If this is not the case, the system is queried in a step S36 whether the internal combustion engine is in the operating state BZ of the first emergency running mode NL1. If this is the case, the system branches into a step S37, in which an emergency running mode setpoint-value TQ_LIH_SP of the torque is determined from a fifth characteristic diagram KF5 as a function of the rotational speed N and the gear ratio GV. The fifth characteristic diagram KF5 is applied in such a way that the vehicle cannot accelerate in an uncontrolled fashion if the emergency running mode setpoint-value LIH_TQ of the torque is prescribed as a setpoint value TQ_SP, otherwise the comfortable traveling mode is still possible. In a simpler embodiment, the emergency running mode setpoint-value TQ_LIH_SP of the torque is determined from a fifth characteristic diagram KF5 as a function of the rotational speed n only.

In a step S38, the setpoint value TQ_SP is limited, by selecting from the emergency running mode setpoint-value TQ_LIH_SP of the torque and the setpoint value TQ_SP of the torque, to the smaller of the two. The processing is then continued in the step S35.

If, in the step S36, the internal combustion engine is not in the operating state BZ of the first emergency running mode NL1, it is in the operating state BZ of the second emergency running mode NL2. In a step S40, an idling setpoint-value TQ_IS_SP of the torque is assigned to the setpoint value TQ_SP of the torque. The processing is then continued in the step S35. There, a setpoint value of the indicated torque, which takes into account the setpoint value TQ_SP of the torque, losses as a result of friction, the gas cycle and the assemblies, is specified. The setpoint value THR_SP of the opening angle of the throttle valve 10 is calculated from the setpoint value of the indicated torque and the rotational speed N. The calculation rule for calculating the setpoint value THR_SP of the opening angle may in this case be the solution of a differential equation which takes into account the dynamic characteristics of the air in the intake tract 1 and also the ambient pressure and the intake air temperature. However, as an alternative, a characteristic diagram may be provided from which the setpoint value THR_SP of the opening angle is determined. The setpoint value THR_SP can also be determined taking into account further operating variables, such as, preferably, the ambient pressure and the intake air temperature. The processing is then continued in the step S21 and ended in step S22.

In a more comfortable embodiment of the third exemplary embodiment of the invention, the setpoint value TQ_SP of the torque is additionally set by means of an ignition angle adjustment by means of a cylinder shut-off procedure or by changing the excess air factor.

The characteristic diagrams are determined in each case by measurements on an engine test bench or by means of a trial trip with a specific vehicle.

We claim:

1. A method of controlling an internal combustion engine connected to a drive train with a shaft, the method which comprises:

providing a first pedal position sensor for sensing a position of an accelerator pedal and a second pedal position sensor for sensing the position of the accelerator pedal;

setting the internal combustion engine to an emergency running mode if a failure is detected of one of the pedal position sensors and defining the other pedal position sensor as a fault-free pedal position sensor;

deriving an actuation signal for at least one actuator of the internal combustion engine in the emergency running mode from the position of the accelerator pedal sensed by the fault-free pedal position sensor;

determining a setpoint value of the torque at a shaft of the drive train as a function of the position of the accelerator pedal; and limiting the setpoint value in the emergency running mode to an emergency running mode setpoint-value which depends on at least one operating variable.

2. The method according to claim 1, which comprises setting the emergency running mode if a difference between the positions of the accelerator pedal sensed by the first and second pedal position sensor is greater than a prescribed threshold value.

3. A method of controlling an internal combustion engine with a cylinder operating in working cycles, which comprises:

providing a first pedal position sensor for sensing a position of an accelerator pedal and a second pedal position sensor for sensing the position of the accelerator pedal;

setting the internal combustion engine to an emergency running mode if a failure is detected of one of the pedal position sensors and defining the other pedal position sensor as a fault-free pedal position sensor;

deriving an actuation signal for at least one actuator of the internal combustion engine in the emergency running mode from the position of the accelerator pedal sensed by the fault-free pedal position sensor;

determining a setpoint value of an air mass per stroke aspirated by a cylinder during a working cycle, and limiting the setpoint value in the emergency running mode to an emergency running mode air mass which depends on at least one operating variable.

4. The method according to claim 3, which comprises setting the emergency running mode if a difference between the positions of the accelerator pedal sensed by the first and second pedal position sensor is greater than a prescribed threshold value.

5. A method of controlling an internal combustion engine, which comprises:

providing a first pedal position sensor for sensing a position of an accelerator pedal and a second pedal position sensor for sensing the position of the accelerator pedal;

setting the internal combustion engine to an emergency running mode if a failure is detected of one of the pedal position sensors and defining the other pedal position sensor as a fault-free pedal position sensor;

deriving an actuation signal for at least one actuator of the internal combustion engine in the emergency running mode from the position of the accelerator pedal sensed by the fault-free pedal position sensor;

determining a setpoint value of an air mass flow rate as a function of the position of the accelerator pedal; and limiting the setpoint value in the emergency running mode to an emergency running mode setpoint-value which depends on a rotational speed of the engine.

6. The method according to claim 5, which further comprises making the setpoint-value in the emergency running mode additionally dependent on a gear ratio of a vehicle transmission.

7. The method according to claim 5, which comprises setting the emergency running mode if a difference between the positions of the accelerator pedal sensed by the first and second pedal position sensor is greater than a prescribed threshold value.

* * * * *